United States Patent [19]

Kadija et al.

[11] 4,207,152

[45] Jun. 10, 1980

[54] PROCESS FOR THE PURIFICATION OF ALKALI METAL CHLORIDE BRINES

[75] Inventors: Igor V. Kadija; Jimmy M. French, both of Cleveland, Tenn.

[73] Assignee: Olin Corporation, New Haven, Conn.

[21] Appl. No.: 33,364

[22] Filed: Apr. 25, 1979

[51] Int. Cl.² ............................ C25B 1/16; C25B 1/26
[52] U.S. Cl. ..................................... 204/98; 204/128; 204/222
[58] Field of Search .......................... 204/98, 128, 222

[56] References Cited

U.S. PATENT DOCUMENTS

| | | | |
|---|---|---|---|
| 2,902,418 | 9/1959 | Burns ..................................... | 204/98 |
| 2,982,608 | 5/1961 | Clement et al. ........................ | 204/98 |

Primary Examiner—R. L. Andrews

Attorney, Agent, or Firm—James B. Haglind; Donald F. Clements

[57] ABSTRACT

Cationic contaminants are removed from an alkali metal chloride brine in a process which comprises contacting the brine with solid particles of a magnesium-containing silicate having a mole ratio of silicon to magnesium of at least about 1:1. The cationic contaminants in the brine adhere to the magnesium-containing silicate particles and the concentration of the cationic contaminants are thereby reduced. A purified brine is obtained by removing the magnesium-containing silicate having cationic contaminants adhering thereto.

Elements of Groups VIII, IV, and II can readily be removed from brines used in electrolytic processes such as the production of chlorine and alkali metal hydroxides or alkali metal chlorates.

23 Claims, No Drawings

PROCESS FOR THE PURIFICATION OF ALKALI METAL CHLORIDE BRINES

This invention relates to the purification of alkali metal chloride brines. More particularly, this invention relates to the purification of alkali metal chloride brines used in electrolytic processes for producing chlorine and alkali metal hydroxides.

Strong brines of alkali metal chlorides are used in electrolytic processes to produce chlorine and alkali metal hydroxides. These brines may be obtained directly from the ground in certain localities. Underground deposits of salt may be mined by pumping water or weak brine into the ground, allowing the brine to fortify itself by dissolving salt from the deposit and then pumping out the strong brine. In many situations, however, the distance between the consuming operation and the source of salt prohibit economic transfer of brines. Commonly solid salt is mined as such or recovered by evaporation from brines and shipped as solid crystals to the consumer. Brine is then reconstituted from the solid salt and water. Whether brine is obtained by solution mining or by the dissolution of solid salt, it contains impurities which cause adverse effects during the electrolysis process. In addition, the re-use of spent brine from the electrolytic cell introduces impurities obtained during contact between the brine and cell components containing, for example, iron or titanium.

It is important to the performance of electrolytic cells that these impurities be eliminated or limited to the extent that they will not interfere with the desired electrolytic reactions.

Various methods of purifying the alkali metal chloride brine used in electrolytic processes have been employed. A common method used was that in which the impurities were precipitated and removed with the use of a purification agent. For example, calcium components that are contained in significant amounts in raw salt or solution mined brines are precipitated and removed in the form of calcium hydroxide or calcium carbonate with an alkalizing agent. The removal of trace amounts of heavy metals required a separate operation, for example, the addition of an agent such as iron chloride to remove certain metals by co-precipitation. Other materials which have been employed include complexing agents or ion exchange resins which while suitable for the removal of selected contaminants add substantially to the cost of brine purification process.

In addition, the methods and materials used hitherto could not be used to treat contaminated brines within the cell environment as the materials used would themselves contaminate cell components and be detrimental to the operation of the cell. Therefore, there is a need for a brine treatment process which overcomes the drawbacks of heretofore practiced methods.

It is therefore an object of the present invention to provide a process for purifying brines used in electrolytic processes for the production of chlorine and alkali metal hydroxides which effectively eliminates a variety of impurities in a single treatment.

Another object of the present invention is to provide a process for purifying brine which can be used within the environment of an electrolytic cell without introducing additional contamination.

A further object of the present invention is to provide a process for purifying brines which employs low cost materials.

These and other objects of the invention are accomplished in a process for purifying an alkali metal chloride brine used in electrolytic processes by removing cationic contaminants which comprises:

(a) contacting the brine with solid particles of a magnesium-containing silicate having a mole ratio of silicon to magnesium of at least about 1:1, whereby the cationic contaminants in the brine adhere to the magnesium-containing silicate, thereby reducing the concentration of cationic contaminants in the brine, and (b) separating the solid particles of magnesium-containing silicate having cationic contaminants adhering thereto from the resulting purified brine.

More in detail, the magnesium containing silicates employed in the process of the present invention have a mole ratio of silicon (Si) to magnesium (Mg) of at least about 1:1. For example, suitable magnesium-containing silicates are those having mole ratios of Si to Mg in the range from about 1:1 to about 10:1, with ratios of from about 1.2:1 to about 5:1 being preferred. Where the magnesium-containing silicate also includes other metals, it is preferred that the ratio of silicon to metal cations is at least about 1:1.

Suitably employed are particles of any magnesium-containing silicate which are dispersible in an alkali metal chloride brine. The dispersible magnesium-containing silicate should be capable of undergoing hydration when in contact with alkali metal chloride brines. Examples of dispersible substances include minerals such as sepiolite and meerschaum as well as palygorskite, attapulgite, augite, and vermiculite. Mixtures of these minerals may also be employed. These minerals have a mole ratio of Si to Mg in the range of from about 1.2:1 to about 2:1. Also suitable are synthetic silicates such as commercial magnesium silicates having the approximate composition $2MgO \cdot 3SiO_2 \cdot 2H_2O$. In addition, synthetic clay materials may be employed having Si to Mg mole ratios as described above. Typical examples of these synthetic clay materials are described, for example, in U.S. Pat. No. 3,671,190 issued to B. S. Neumann; U.S. Pat. Nos. 4,040,974 and 4,054,537 issued to A. C. Wright et al; U.S. Pat. No. 3,666,407 issued to J. K. Orlemann; U.S. Pat. No. 3,844,979 issued to D. A. Hickson; or U.S. Pat. No. 3,855,147 issued to W. T. Grandquist.

Synthetic siliceous clay mineral products such as those produced by N. L. Industries and sold commercially under the trademark BARASYM ® can be suitably employed. Preferred as magnesium-containing silicates employed in the process of the present invention are minerals such as sepiolite and meerschaum.

Alkali metal chloride brines employed include, for example, sodium chloride and potassium chloride, where the brine concentrations are those employed in electrolytic processes for the production of chlorine, an alkali metal hydroxide or an alkali metal chlorate.

In order to simplify the disclosure of the invention, it will be described hereinafter in terms of sepiolite, a preferred embodiment of the magnesium-containing silicate having a Si to Mg mole ratio of about 1.5:1 and sodium chloride as a preferred alkali metal chloride brine.

In the process of the present invention, cation contaminated brine is contacted with particles of sepiolite by passing the brine through a body of sepiolite particles or by admixing the sepiolite with sodium chloride brine to form a dispersion. In contact with the brine, the sepiolite particles are hydrated and swell to become gel-like. While the exact means by which the cation contaminants are removed is not known, it is believed that the cationic contaminants may be present in the brine in ionic or colloidal form. When these cationic contaminants come in contact with the surface of the finely divided sepiolite particles, they are adsorbed on the surface of the sepiolite particles. As the surface of the sepiolite particles become coated with cationic contaminants, the coated particles tend to coagulate or agglomerate to form larger particles which readily settle out of the brine when agitation is discontinued. As a result, the concentration of cationic contaminants in the clarified brine is markedly reduced.

In the process of the present invention, any suitable particle size of sepiolite may be employed, for example, particles having a diameter in the range of from about 0.5 to about 10 millimeters, and preferably from about 0.5 to about 2 millimeters. Finely divided particles of sepiolite are most preferred in order to obtain maximum surface area for contact with the cationic contaminant in the brine.

In a preferred embodiment, the sepiolite is dispersed throughout the brine solution. The dispersion is accomplished without the need of a dispersing agent. Motor driven agitators, gas agitators, and the like may be employed to disperse the sepiolite within the brine and to facilitate coagulation of the contaminated sepiolite. The electrolysis process itself will readily disperse the sepiolite particles through the brine when the brine is in the electrolytic cell.

Any suitable amount of sepiolite may be added to the sodium chloride brine to form a dispersion. For example, sepiolite is added to the brine in an amount ranging from about 0.1 to about 20, and preferably from about 0.5 to about 10 percent by volume of brine.

A wide variety of contaminants may be removed from sodium chloride brine including elements of Groups II (A & B), IV (A & B), and VIII of the Periodic Table (Webster's Third New International Dictionary, G & C Merriam Co., 1961).

For example, Group VIII elements such as iron or nickel and the platinum group metals are readily removed from both acid and alkaline sodium chloride brine using the process of the present invention. In the case of iron, the removal can be visually observed as the beige colored dispersion of sepiolite in sodium chloride brine darkens to a brown or brown-red color as iron is removed from the brine.

Similarly, elements of Group IV (A) such as silicon and IV (B) such as titanium are removed by treatment of the brines with sepiolite.

Elements of Group IV and VIII can be readily removed from sodium chloride brines having a pH in the range of from about 1 to about 12, preferably from about 2 to about 10.

Group II (A) elements such as calcium and magnesium are removed from alkaline sodium chloride brines having a pH in the range of from about 10.5 to about 14 and preferably from about 10.5 to about 12.

Mercury, a Group II (B) element can be removed by sepiolite particles from both acidic and alkaline brines using the process of the present invention.

The novel process of the present invention may be employed for the removal of cation contaminants from acidic brines such as those obtained from a mercury cell or a cell employing a porous diaphragm or membrane where a portion of the brine is recirculated from the anode compartment. Sepiolite is admixed with acidic brine to remove heavy metal cations, separated from the brine, and the brine returned to the cell.

For the removal of metals such as calcium or nonmetals such as silicon, alkaline brines which are produced by the treatment with alkali metal hydroxides and/or alkali metal carbonates can be admixed with sepiolite to further reduce the concentration of these elements to well below the levels obtained by the use of these normal brine treatment steps.

Sepiolite can also be used as a replacement for sand in fillers used for removing calcium compounds and silica from alkaline brines.

In addition, unlike other known brine treatment procedures, sepiolite can be admixed with an anolyte contaminated with cations within the cell proper, for example, the anode compartment to remove the contaminants from the brine without itself contaminating components of the cell such as the anode, the separator, or the cell structure. In this case, the cell may be operated for a short period, the dispersion of sepiolite and brine drained from the cell, the sepiolite removed, for example, by filtering, and purified brine returned to the anode compartment.

The process of the present invention may also be used in electrolytic cells employing a membrane or diaphragm and having three compartments. The three compartments are an anode compartment, a middle or buffer compartment, and a cathode compartment. In the anode compartment, the sodium chloride brine is electrolyzed to produce chlorine while cations, water and, in some cases, brine pass through the separator into the middle compartment. In the middle compartment, a dilute solution of sodium hydroxide is formed or is present. This solution may contain undesirable cations such as iron which are readily removed by adding sepiolite as described above.

As metallic mercury is not readily adsorbed by sepiolite while mercury ions are, it can be used to remove cation contaminants from brine in a mercury cell.

When using other magnesium-containing silicates, it may be desirable to use a dispersing agent to prevent the particles from settling out of the brine. Suitable dispersing agents include gum (natural, modified, or synthetic) which when added, for example, in amounts of from about 0.1 to about 2 grams per liter of brine will effectively disperse the silicate particles. Alginates, xanthan gum or alkyl aryl polyether alcohols are suitable examples of dispersing agents.

While the removal of cation contaminants by the process of the present invention has been described in relation to alkali metal chloride brines, it will readily be apparent that these cation contaminants can be removed from, for example, other aqueous solutions in which they are present as impurities.

The novel process of the present invention is illustrated by the following examples without any intention of being limited thereby.

EXAMPLES 1-2

Brine having a concentration of 293 grams of sodium chloride per liter at a pH in the range of 10.5–11 was heated to a temperature of 76° F. Ferrous chloride, calcium chloride, nickel sulfate, sodium metasilicate, and magnesium chloride were added to each of two portions of the brine to provide the concentrations of cations shown below.

Sepiolite was added to the brine in an amount equal to 5 percent by volume of liquid. The brine was stirred for one hour and allowed to settle. The clear brine was carefully removed, filtered, and analyzed. The purified brine had greatly reduced concentrations of the cation contaminants as shown below.

|    | Cations present (parts per million) | | | |
| --- | --- | --- | --- | --- |
|    | In Original Brine | | In Purified Brine | |
|    | Example 1 | Example 2 | Example 1 | Example 2 |
| Fe | 3.5 | 4.0 | 0.06 | 0.06 |
| Ca | 5.3 | 6.3 | <0.3 | <0.3 |
| Ni | 8.3 | 19.3 | <.02 | <.02 |
| Si | 7.9 | 6.6 | 2.9 | 2.8 |
| Mg | 1.96 | 2.04 | 0.8 | 0.5 |

EXAMPLES 3–9A

In each Example, a known quantity of ferrous chloride was added to a liter of brine containing 290 grams of sodium chloride. The brine was stirred to permit the ferrous chloride to dissolve. Sepiolite having a particle size less than 30 mesh was added in various volume proportions to the brine containing ferrous iron. The mixture was stirred for 60 minutes and maintained at a temperature of 24.4° C.

The sepiolite treated brines were then left to settle for 16 hours. After the settling period, the clear solution was decanted, filtered, and analyzed for the concentration of ferrous iron. In Example 9A, the filtrate of EXAMPLE 9 was retreated with sepiolite and the ferrous iron concentration again determined. The results of these Examples are given in TABLE I below.

TABLE I

IRON REMOVAL FROM SODIUM CHLORIDE BRINES

| Example No. | Brine pH | Original Fe Concentration (ppm) | Sepiolite Addition % Volume | Fe Concentration after treatment (ppm) | % Fe removed |
| --- | --- | --- | --- | --- | --- |
| 3 | 8.5 | 1.41 | 5.0 | .10 | 92.9 |
| 4 | 8.5 | 1.00 | 10.0 | .13 | 87.0 |
| 5 | 8.5 | 9.89 | 5.0 | .18 | 98 |
| 6 | 8.5 | 11.44 | 10.0 | .08 | 99.3 |
| 7 | 8.5 | 10.57 | 1.5 | .12 | 99 |
| 8 | 2.0 | 8.73 | 5.0 | .15 | 98.3 |
| 9 | 8.5 | 2.70 | 0.5 | .80 | 70.4 |
| 9A | 8.5 | .80 | 0.5 | .68 | 75.0* |

*Total % Fe removal for Examples 9 and 9A.

EXAMPLE 10

A diaphragm electrolytic cell for the electrolysis of sodium chloride brine (300 grams per liter) was operated at a temperature of 93°±3° C., a current density of 2.0 kiloamps per square meter of anode surface and a cell voltage of 3.0–3.1. The cell operated for a period of 64 days at a current efficiency in the range of 90–97 percent. During the next two weeks, a sudden decrease in current efficiency to a level of about 80 percent was determined to be caused by impurities in the brine. Cell operation was discontinued. An amount of 0.2 liters of a brine containing 10 percent by volume of sepiolite dispersed therein was added to a volume of 1.5 liters of anolyte to provide the anolyte with about 1–1.5 percent by volume of sepiolite. The cell was restarted, operated for one hour, and the cell again shutdown. The anolyte was drained from the cell, filtered, and recycled to the anolyte compartment and operation of the cell restarted. Current efficiency of the cell again returned to above 90 percent while maintaining the voltage in the range of 3.0–3.1.

What is claimed is:

1. A process for purifying an alkali metal chloride brine used in electrolytic processes by removing cationic contaminants which comprises:
   (a) contacting said brine with solid particles of a magnesium-containing silicate having a mole ratio of silicon to magnesium of at least about 1:1, whereby said cationic contaminants in said brine adhere to said magnesium-containing silicate particles, thereby reducing the concentration of said cationic contaminants in said brine, and
   (b) separating the resulting solid particles of magnesium-containing silicate having said cationic contaminants adhering thereto from the resulting purified brine.

2. The process of claim 1 in which said alkali metal chloride brine is selected from the group consisting of sodium chloride or potassium chloride.

3. The process of claim 2 in which said magnesium-containing silicate is dispersed in said brine in an amount of from about 0.1 to about 20 percent by volume of said brine.

4. The process of claim 3 in which said magnesium-containing silicate has a particle size in the range from about 0.5 to about 10 millimeters in diameter.

5. The process of claim 4 in which said magnesium-containing silicate is selected from the group consisting of sepiolite, meerschaum, palygorskite, attapulgite, augite, and vermiculite.

6. The process of claim 4 in which said cation contaminant is a Group VIII element.

7. The process of claim 6 in which said cation contaminant is iron.

8. The process of claim 6 in which said cation contaminant is nickel.

9. The process of claim 4 in which said cation contaminant is an element of Group IV.

10. The process of claims 6 or 9 in which the pH of said brine is from about 1 to about 12.

11. The process of claim 9 in which said cation contaminant is silicon.

12. The process of claim 5 in which said cation contaminant is an element of Group II.

13. The process of claim 4, 5, 6, 9, or 12 in which said amount of said magnesium-containing silicate dispersed in said brine is from about 0.5 to about 10 percent by volume of said brine.

14. The process of claim 1 wherein said brine is contacted with said particles of magnesium-containing silicate in an electrolytic cell, the resulting slurry of particles in said brine is electrolyzed for a predetermined period prior to separating.

15. The process of claim 14 in which the amount of said magnesium-containing silicate added to said brine is from about 0.1 to about 20 percent by volume of said brine.

16. The process of claim 15 in which said magnesium-containing silicate is selected from the group consisting of sepiolite, meerschaum, palygorskite, attapulgite, augite, and vermiculite.

17. The process of claim 16 in which said magnesium-containing silicate is sepiolite.

18. The process of claim 17 in which the molar ratio of silicon to magnesium in said particles is in the range from about 1.2:1 to about 5:1.

19. The process of claim 18 in which the particle size of said particles is in the range from about 0.5 to about 2 millimeters in diameter.

20. The process of claim 19 in which said alkali metal chloride brine is sodium chloride having a pH in the range of from about 2 to about 10.

21. The process of claim 20 in which said cationic contaminants are selected from the group consisting of iron, nickel, and silicon.

22. The process of claim 19 in which said pH of said brine is in the range of from about 10.5 to about 12.

23. The process of claim 22 in which said cationic contaminant is selected from the group consisting of calcium, magnesium, silicon, iron, and nickel.

* * * * *